Figure 6:
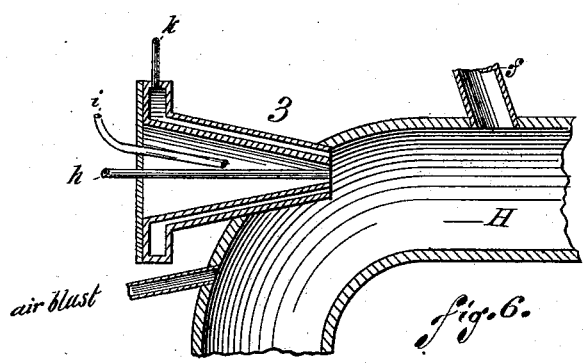

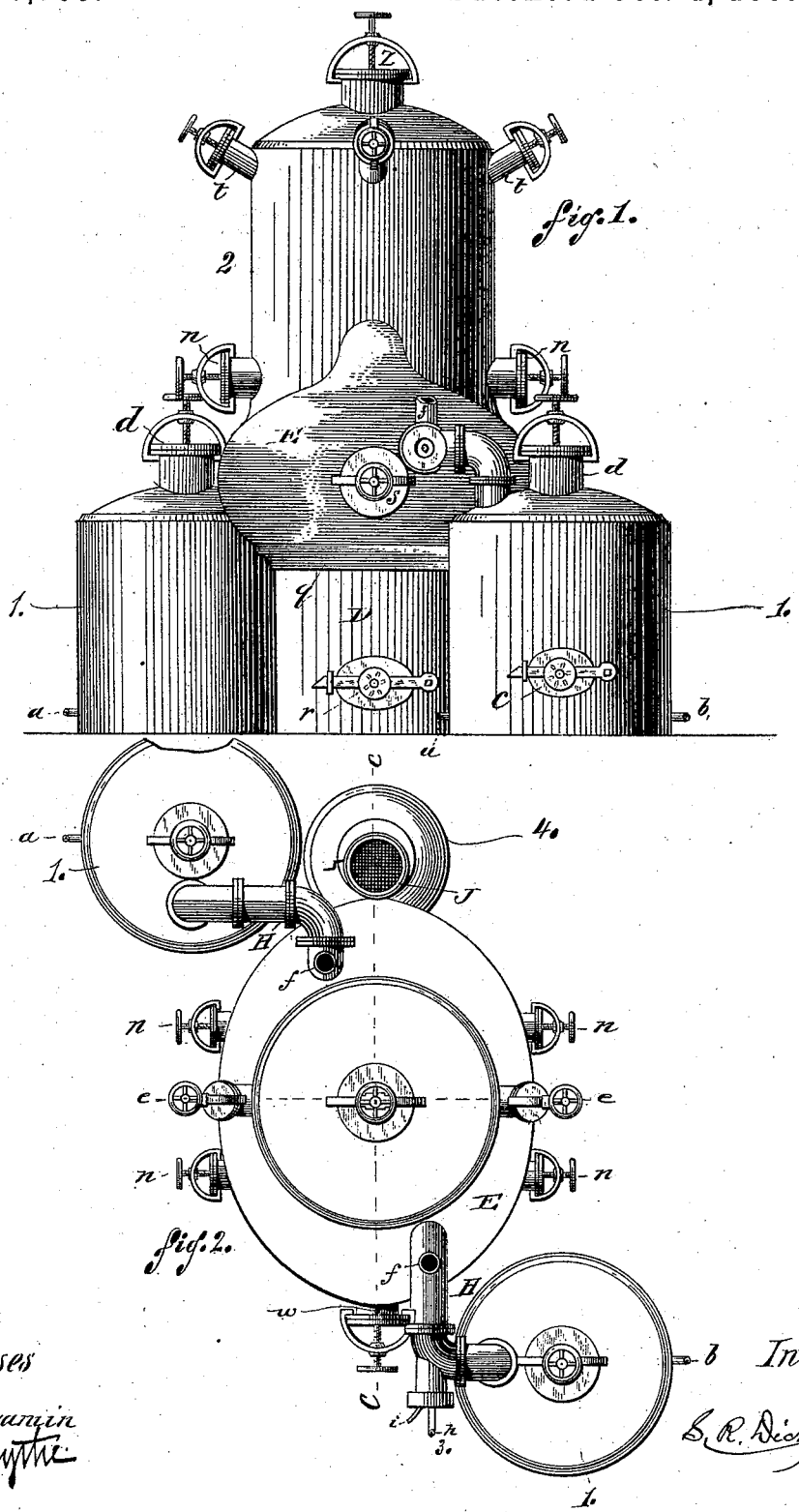

(No Model.) 3 Sheets—Sheet 2.
S. R. DICKSON.
PROCESS OF AND APPARATUS FOR THE MANUFACTURE OF GAS.
No. 370,768. Patented Oct. 4, 1887.
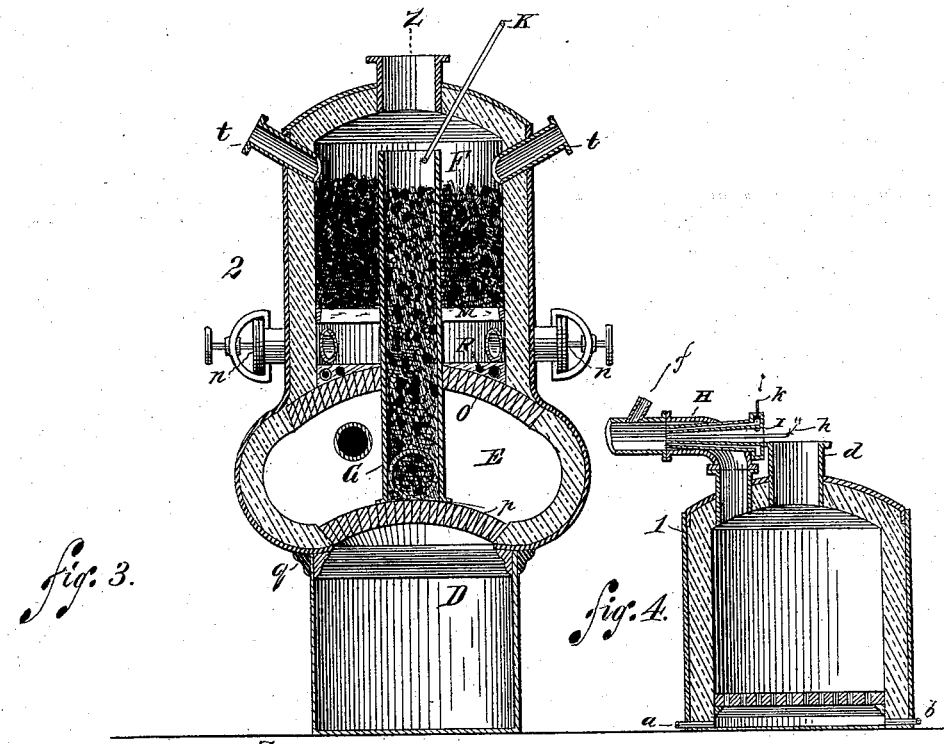
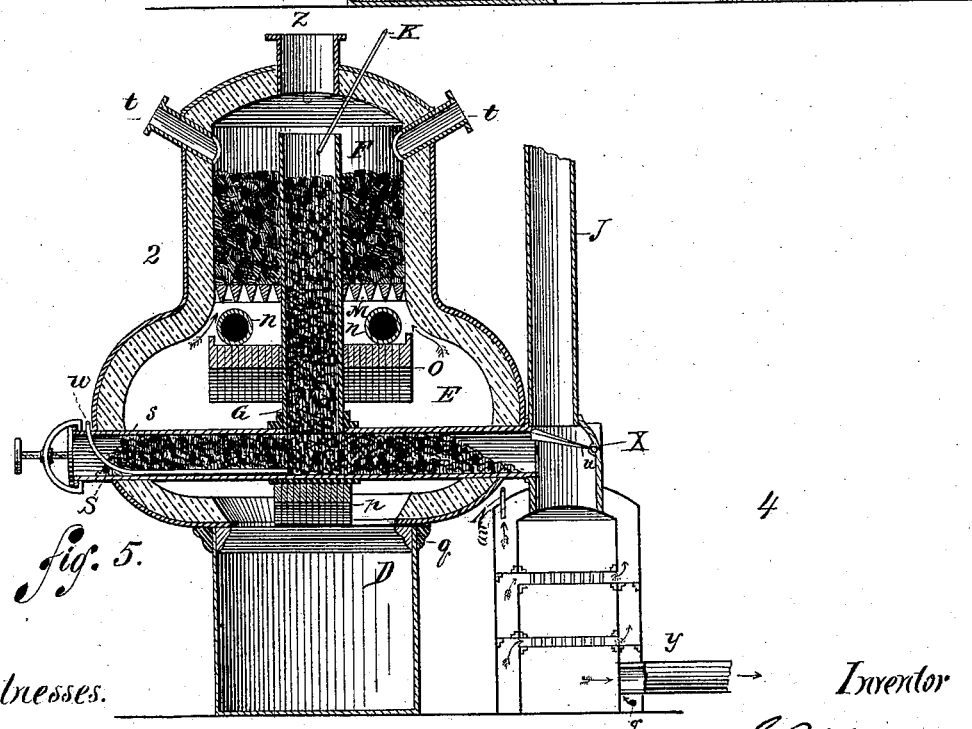

(No Model.) 3 Sheets—Sheet 3.

S. R. DICKSON.
PROCESS OF AND APPARATUS FOR THE MANUFACTURE OF GAS.

No. 370,768. Patented Oct. 4, 1887.

Water Scrubbers

Witnesses
Inventor
S. R. Dickson

UNITED STATES PATENT OFFICE.

SAMUEL R. DICKSON, OF NEW YORK, N. Y.

PROCESS OF AND APPARATUS FOR THE MANUFACTURE OF GAS.

SPECIFICATION forming part of Letters Patent No. 370,768, dated October 4, 1887.

Application filed May 4, 1885. Serial No. 164,425. (No model.)

*To all whom it may concern:*

Be it known that I, SAMUEL R. DICKSON, of the city, county, and State of New York, have invented a new and useful Process of and Apparatus for the Manufacture of Gas for Heating and Illuminating Purposes, and for the production of cyanogen or of some of its compounds; and I do hereby declare that the following is a full and exact specification of the same, reference being had to the accompanying drawings, forming part of this specification.

My invention relates to the manufacture or production of cyanogen, or some of its compounds, and gas, intended either for illuminating or for heating purposes, by the decomposition of coal, steam, petroleum, natural gas, or other gaseous or liquid hydrocarbons, used severally or in combination with atmospheric air, whereby I obtain an exceedingly cheap gas and a large amount of cyanogen or some of its compounds.

The component gaseous products by my process, consisting of hydrocarbons, hydrogen, nitrogen, and carbonic oxides, differ in their chemical character in no particular from the same gases produced by any other means; but in the aggregate gaseous production by my process the difference is marked, and in this particular lies that which I esteem one of its many superior advantages.

My process involves, primarily, the introduction of a nitrogen-bearing material into a heated chamber, into which carbon and an alkali in a finely-divided condition are also introduced, the mixing of the materials so introduced, and the simultaneous decomposition and recombination of said elements, to produce, respectively, a combustible gas free, or comparatively free, from nitrogen and cyanogen, or a compound thereof.

My invention may be used to eliminate nitrogen from mixed gases (such as carbureted hydrogen, carbonic oxide, and nitrogen) otherwise ready for combustion, or from the substance or substances from which the gases are produced. In the latter case the elimination takes place at practically the same time that the combustible gas is produced. I therefore use the term "nitrogen-bearing material" to signify either mixed gases containing nitrogen or substances capable by decomposition and reunion in different combinations of producing such gases.

I may here state that the use of carbon and an alkali to free a gas from nitrogen is well known, and is not claimed, broadly, by me.

It is the object of my invention, however, to obtain a more effective and economical result in more thoroughly abstracting the nitrogen, producing more cyanogen, and getting the complete effect of the carbon and alkali by simultaneously introducing the materials in a finely-divided state into the retort and there forcibly mixing them. Neither do I claim as new in my apparatus an injector and supply-pipes adapted for simultaneously introducing gases, liquids, and solids into the furnace-chamber or retort.

The gas thus produced is preferably improved for the purpose of combustion by the use of carbon, resulting in the conversion of such part of the gas as is in the form of carbonic acid into carbonic oxide and in the production of some carbureted hydrogen. The gas may then be carbureted to any desired degree of richness for the purpose of illumination, though this is not necessary to its use as fuel.

The process may be preceded by a coking operation, (and I have shown in the drawings the apparatus for this,) the resulting gases being introduced and combined with the alkali, carbon, air, and steam, and the coke being used for the subsequent conversion of the carbonic-acid gas.

While the combustible gas passes off to be used or further treated in any desired and suitable manner, the cyanogen collects in solid form in the lower part of the chamber into which the materials were introduced, or in some suitable collecting vessel or chamber connected therewith. I may state that the cyanogen thus deposited will not ordinarily be pure, being usually compounded or mixed with residua of said materials.

To enable my invention to be more readily understood, I have shown in the accompanying drawings a means for carrying the same into effect.

Figure 7:
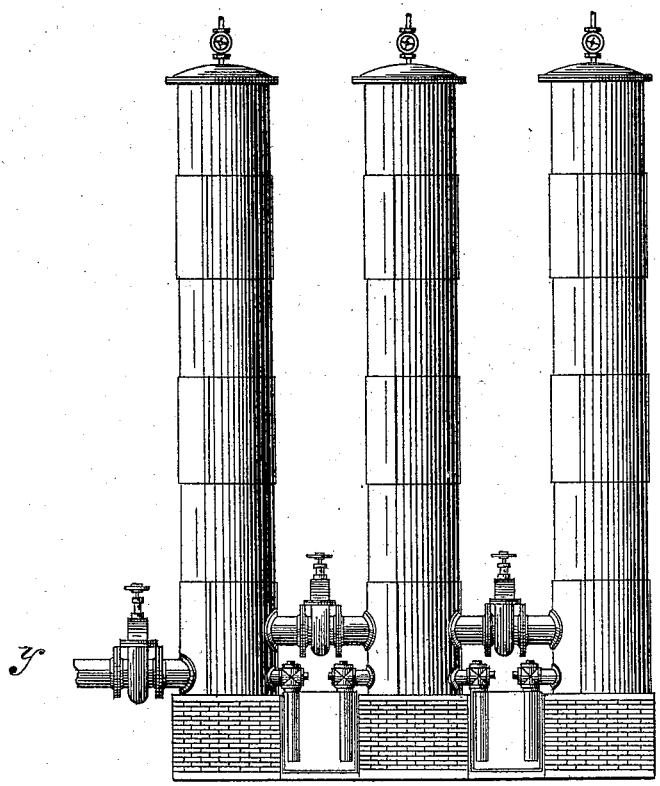

In said drawings, Figure 1 is a front elevation of an apparatus for carrying out my invention. Fig. 2 is a plan view of the same. Fig. 3 is a vertical section of the converting-furnace on the line e e, Fig. 2. Fig. 4 is a similar section of the coking-furnace, the injector being also shown in section. Fig. 5 is a vertical section of the converting-furnace and the condenser on the line c c, Fig. 2. Fig. 6 is a sectional view, on a larger scale, of the injector. Fig. 7 is a view of the scrubbers.

In carrying out my process I employ, by preference, the following agencies: first, the combination, with a furnace, 2, which I shall in this specification term a "converting-furnace," of means—such, for example, as the pipe H and steam-injector $h$—for introducing the nitrogen-bearing material, the carbon, and an alkali into the said converting-furnace, and at the same time forcibly mixing the substances so introduced; second, a means for supplying petroleum to the injector $h$—such as the pipe K—for the purpose of initially and from time to time, as may be required, bringing up the heat of the furnace-compartment E to the requisite degree; third, a furnace-chamber, F, adapted to contain incandescent coke, through which the gases from compartment E may be driven and improved by the change of the carbonic acid to carbonic oxide; fourth, a carbureting-retort, G, and supply-pipe K for hydrocarbon, by which the gases, if designed for illuminating, may be properly carbureted.

I would here remark, however, that though the above and hereinafter described apparatus is the best means now known to me, all things considered, for carrying out my process, various forms of furnace and various arrangements of the other appliances relative thereto may be employed without departing from my invention, and as any well-known and suitable methods may be employed for these purposes it is not necessary to an understanding of my invention that such operations should be here described in detail.

Having outlined the scope and object of my process and invention for the production of cyanogen and compounds thereof and gases, I pass to the detailed description of its several parts and their relations with each other.

1 shows my air-tight coking-furnace, connected by the fire-clay pipe or chamber H with the converting-furnace 2. $a$ is an air-pipe leading from the air-condenser 4 into the bottom part of the coking-furnace. The atmospheric air is forced into a reservoir (not shown) under a given pressure, and from the reservoir it passes through the air-condenser 4, where it becomes highly heated, and is then admitted beneath the floor of the coking-furnace (for coking purposes) through a pipe of known diameter. The air thus delivered is at all times a known quantity and under control. $c$ is an air-tight-fitting door for the purpose of withdrawing the coke when the process is completed. $b$ is a steam-pipe for conveying steam from a boiler (not shown) to the bottom of the furnace for the purpose of extinguishing the incandescent coke when the process of coking is completed, and the production thereby of gases. $d$ is a feed-hopper for charging coals to the furnace.

Fig. 6 shows an enlarged sectional view of the fire-clay chamber H, or pipe into which the connecting-pipe from the coking-furnace enters, and which conveys the volatile products from the coking-furnace to the converting-furnace; likewise pipe-connections $h$, $k$, and $i$, which together constitute a steam petroleum-injector. $k$ is a pipe for conducting petroleum or some other liquid hydrocarbon into the body of the injector, where, by the force of the steam, it is driven through pipe or chamber H into the oven or middle compartment (section E) of furnace 2 for combustion. $h$ is a steam-pipe from the steam-boiler. (Not shown.) $i$ is a pipe for conveying atmospheric air to supply oxygen for the combustion of the petroleum. $f$ is a pipe-passage placed in front of the steam petroleum-injector, through which is introduced finely-ground carbon mixed with an alkali. It is readily seen by this mechanical arrangement that when the steam is permitted to enter the injector through pipe $h$ it will be forced through the pipe or chamber H into the oven-compartment or section E of furnace 2, and carry along with it by the same force petroleum which enters the injector through pipe $k$. The petroleum, being thus sprayed into section E, is rapidly burned by means of the oxygen of the air admitted through pipe $i$, for it must be borne in mind that not otherwise is atmospheric air admitted into the furnace. The steam thus entering the furnace or oven-section of 2 sucks or draws over the volatile products from the coking-furnace 1, and it also drives and disperses the finely-ground carbon and alkali through the gaseous mixture in the oven E, where the chemical conversions, to be hereinafter more particularly described, take place.

Fig. 3 shows a vertical section of my converting-furnace. I have in the construction shown divided it into four sections or compartments, and such division is by no means an arbitrary one, as three separate and distinct chemical conversions or reactions are effected in this furnace under conditions essentially differing from each other, requiring peculiar mechanical arrangements productive of such favorable actions.

This converting-furnace is built of iron, lined with fire-brick or with some other refractory material, which is supported and held in position by double angle-iron $q$, secured to the iron shell of the furnace, save and excepting in the lower compartment or section D, in which the fire-brick lining is omitted, as it is desirable that the temperature of this compartment of the furnace be below that of the oven or compartment E.

G is the retort-section, which is placed vertically in section, F and passes beneath the grate-bars M through arch O into the oven or middle compartment or section, E, of the furnace, and is supported by arch $p$. The horizontal fire-clay pipe $s$ is connected with this retort, and is properly a part of it, which pipe finally conducts the gaseous products from the conversion-furnace to its connection on the outer side with pipe X, which latter conducts the gas to the atmospheric-air heater or condenser 4 and to the other purifying apparatus of the works. Arch O is constructed beneath the fire-clay grate-bars M of the furnace-section F, for the purpose of preventing the ash and other materials falling into the lower compartments of the furnace. At each end of this arch are openings for the passage of the gases from compartment E upward through the incandescent coal in section or compartment F to the open end of retort G. There are several openings, $n$, made beneath the grate-bars through the sides of the furnace, for the purpose of cleaning the fire and removing accumulations on arch O. They are provided with air-tight-fitting covers.

K is a pipe for the introduction of petroleum or other liquid hydrocarbon within the body of retort G, for the purpose of carbureting or imparting increased illuminating power to the gases before they pass through the retort and while the gases are in a highly-heated state. Z shows the charging-opening of the retort. The retort is shown as partially and loosely filled with broken fire-brick or other refractory materials, for the purpose of presenting a large heating-surface to the action of the gases. This filling extends for like purposes into the horizontal fire-clay pipe of the retort.

M shows the fire-tile grate-bars for the support of the fire in section or compartment F of the furnace.

$r$ shows a door made in the bottom of the lower section or compartment, D, of the furnace, for the purpose of withdrawing the cyanogen and other alkaline compounds which accumulate in this compartment.

$t\ t$ are air-tight doors for charging coal into the furnace F.

$w$ is a pipe for the admission of superheated steam into the fire-clay pipe $s$, connected to retort G, for the purpose of converting the carbonic oxide produced by the passage of the gases through the incandescent carbon in compartment F into carbonic-acid gas and the further production of hydrogen gas.

In Fig. 5 is shown a vertical section of the atmospheric-air condenser or air-heater, it being the intention of its construction to heat the atmospheric air by the radiation from the heated gases which pass through it. In the chamber X, placed upon the top of this condenser or air-heater, is valve $u$, by the operations of which the gases passing through fire-clay pipe $s$ can be diverted either through chimney-pipe J or into the condenser or atmospheric-air heater. The air-heater is constructed of boiler-iron, with an outer and inner wall so placed as to leave an air-passage between them. The air, entering the heater at $g$, passes up and fills the space between the walls to the under side of the lower horizontal partition. Thence, passing through and between the plates of the partition, the air is enabled to occupy the middle space between the two walls of the air-heater, and, when filled, the air passes through the upper horizontal partition, as it did the lower one, filling the space between the two walls of the heater in the top or dome, and makes its exit at pipe N. Pipes $a$ and $i$ may be continuations of pipe N, and this heated air used for both coking the coal and by the steam petroleum-injector. The heated gases, entering the air-heater at X, pass through the two horizontal partitions by openings made in the partitions by placing many small pipes in the partitions in the manner as tubes are placed in the two heads of a tubular steam-boiler.

Fig. 5 shows an elevation of scrubber and condensers to be connected by pipe $y$ with the atmospheric-air condenser; but, inasmuch as I propose nothing new in this department of gas-production pertaining to its purification beyond that above referred to, I deem it unnecessary in this specification to describe a well-known and universally-employed process for further purification of the gas.

Having described in detail the several parts of a generating apparatus necessary for the production of cyanogen and compounds thereof and gas, I will now describe the working of my process and the chemical reactions which take place.

To properly conduct the business of gas-manufacturing, other appliances in addition to those herein shown are requisite and necessary; but as my invention and improvement relate only to the generative department, I shall, so far as possible, confine myself to this branch of gas-making.

The purpose for which the gas is manufactured measurably governs some parts of the additional outfit, as well as some of the materials used. If the gas produced is intended for fuel purposes, then a gaseous mixture consisting of carbonic oxide and hydrogen reasonably free from carbonic-acid gas and other impurities will meet the requirements, and, with proper care in the selection of materials and in the manufacture of the gas, lime purification can be dispensed with, thus saving a costly part of the apparatus and lessening the cost of production; but if the gaseous product is required for illumination, or for both light and fuel, then greater care is to be observed in its production and subsequent purification, and if proper coal used in its manufacture is not selected great difficulty will be encountered in the production of a satisfactory gas, as excess of purification is unattainable in the manufacture of gas for illumination so long as the gas is burned for light as at present; but to the production of gas by my process, and with appliances shown by the accompanying drawings, the purpose of its manufacture has but slight relation, and such changes as are necessary to produce a cheap gaseous mixture suitable for either purpose will be noted hereinafter.

To operate the mechanical appliances here shown for the production of illuminating-gas, cyanogen, and compounds of the latter, retort G should be loosely filled with fire-brick or some refractory material, and this filling should extend, as shown, within the fire-clay pipe $s$, so as to slightly obstruct the passage of the gases through the pipe. Valve $u$, communicating with the chimney, is to be opened for the passage of gases of combustion to the chimney. Furnace F is now to be charged above the grate with carbon—such as anthracite coal, coke, or charcoals—and the coals in the furnace being ignited the combustion should be allowed to proceed slowly for several hours, or until the retort or brick lining of the furnace has become quite well heated. These precautionary measures are always necessary with any new and green furnace; but after the first run the furnace can be shut down for many hours by the exclusion of all atmospheric air and kept sufficiently warm to be brought up to a working heat in a few moments. When the blower is applied, the firing is to be continued until the retort and furnace-lining become highly heated. When retort G and furnace F have been sufficiently heated, the air-blast should be discontinued and the fire carefully cleaned and, if necessary, replenished with coal. The coking-furnace 1 having been properly charged with bituminous or coking coals, the charge can now be ignited and permitted to burn a short time by the ordinary draft of the furnace, when all ingress of air should be closed except by the air-pipe $a$, which will soon produce proper combustion in this furnace. Valve $u$, communicating with the chimney, is now to be closed, as the furnaces are now ready to be operated for the production of illuminating-gas and cyanogen and compounds thereof. The two furnaces being thus charged and made ready, the superheated steam is permitted to pass by pipe $h$ into the fire-clay pipe or chamber H through the steam petroleum-injector 3 with the proper quantity of petroleum and atmospheric air to insure combustion through pipes $k$ and $i$ to maintain the proper degree of heat in the oven or middle compartment of the converting-furnace 2. While the furnaces are being thus operated there should be introduced into the fire-clay pipe or chamber H through pipe $f$, which is situated in front of the steam-injector, a proper admixture of carbon and alkali, which has previously been properly mixed and reduced to fine powder, which admixture of carbon and alkali is by the force of the steam petroleum-blast sprayed through the intensely-heated gases in the oven or middle compartment of the converting-furnace 2, and being thus introduced into the heated furnace under the most favorable conditions the combination of the heated nitrogen with alkali and carbon is effected, producing a cyanide and cyanate of the alkali used, which falls to the lower compartment or into section D of the furnace. The nitrogen being thus eliminated from the mixture of gases, the remaining gases consist of hydrocarbon, free hydrogen, and carbon oxides, which passing upward around the sides of arch O through the incandescent carbon in the upper section or compartment, F, of the converting-furnace, the carbonic-acid gas is converted into carbonic oxide by the absorption of carbon from the coal through which it passes. As they pass from this compartment of the converting-furnace the gases intended for illumination can, if deemed necessary, be enriched or carbureted by the admission of petroleum, benzine, or other liquid hydrocarbon through pipe K, by means of which any liquid hydrocarbon is introduced upon the top of the broken fire-brick in retort G. The liquid hydrocarbon is there vaporized, and, commingling with the heated gases as they descend through the intensely-heated masses within the retort, becomes gasified and fixed. This gaseous product will consist of hydrocarbon and carbonic oxide of such illuminating power as may have been desired by the use of the petroleum by pipe K; but the gases will require further purification before combustion for illumination to remove any trace of sulphur, ammonia, and carbonic acid.

Circumstances may arise where it will be desirable to manufacture illuminating-gas relatively free from carbon oxides. In every such case it will be found expedient not to carburet the gas, as recommended above, but to permit the mixed gases to pass through the heated refractory filling in retort G to the intersection of fire-clay pipe $s$, at which point the gases should be subjected to a flow of highly-superheated steam through pipe $w$, the superheated steam decomposing the carbonic oxide produced in compartment F of the converting-furnace and producing an equal volume of carbonic acid and hydrogen. The gases, consisting, principally, of a mixture of free hydrogen, hydrocarbons, and carbonic-acid gases, should now pass to the condensers, and in the scrubbers the carbonic-acid gas can be very readily eliminated by ammoniacal gas produced by the decomposition of the cyanogen or the compounds thereof, formed by the combination of the nitrogen with the carbon and alkali in the oven or middle compartment of the converting-furnace. After the carbonic-acid gas is eliminated the property of higher luminosity can be imparted to the gas by any of the modes now employed. It must, however, be borne in mind that in working my process for the production of illuminating-gas the atmospheric air used in the coking-furnace is first highly heated by its passage through the air-heater 4. The advantages of using heated air in the coking-furnace are that by its use the volatile products of the coal are expelled in less time and by the use of much less quantity than is requisite where cold air is used. Consequently much less carbon oxides are produced and nitrogen liberated, the object being to expel the hydrocarbon from the coal in form of vapor instead of hydrocarbon gas, and to keep the combustion in the coking-furnace as low as is practicable for the accomplishment of the object in view. If the operation in the coking-furnace is conducted at a low degree of heat, the volatile portion of the coal will pass over in the form of vapor or smoke mixed with carbonic oxide, and when this mixture of vapor and gas is subjected to the action of the steam petroleum-injector the heated carbonic oxide unites with the oxygen from the steam, forming carbonic-acid gas, and the hydrocarbon vapor is converted into hydrocarbon gas; but should the process of coking be conducted at a high degree of heat and with an excess of cold atmospheric air the gases in such case passing over from the furnace would consist largely of nitrogen, carbonic acid, and hydrocarbons, which latter gas would be mostly burned by the action of the steam petroleum-injector.

When the volatile portion of the coal is expelled, or when the operation of coking is sufficiently complete, the hot-air valve is to be closed and superheated, or wet steam is then to be admitted beneath the hearth of the coking-furnace, which steam, coming in contact with the incandescent coke, is at first decomposed, forming carbon oxides and hydrogen. This process is to be continued until the fire in the coke is extinguished, and the gases thus obtained utilized as all others in the converting-furnace; but should the coke not be required to charge compartment F of the converting-furnace, then by the use of highly-heated steam and a small portion of heated atmospheric air the production of gases can be continued in the coking-furnace until the coke is wholly consumed. If, in operating the steam-injector 3, the object for its employment is not disregarded, the desired result is a chemical certainty. The injector is used for the threefold purpose of maintaining the required heat in the oven-compartment E of the converting-furnace, to introduce water-vapor for the production of free hydrogen gas, and to disseminate the finely-pulverized carbon and alkali through the mixture of heated gases, thereby forming cyanogen or some compound thereof. Therefore no more heated atmospheric air (from the atmospheric-air heater 4) should be admitted through pipe $i$ than is necessary to maintain the requisite heat. The quantity of superheated steam should be regulated with reference to the quality of gas it is desired to produce, and the quantity of petroleum will be in all cases dependent upon the kind and quantity of coals mixed with the alkali. If they contain a large amount of hydrocarbon, but little, if any, petroleum will be required.

From the mechanical arrangements here shown and described it must be apparent to those conversant with the science of gas-making that the kind of gas produced will much depend upon the manner of working the apparatus, for if the steam petroleum-injector is worked with an excess of atmospheric air the hydrocarbons, which would otherwise be a material product of the process, will be converted into carbon oxides and free hydrogens, thus liberating much nitrogen, necessitating the use of a large amount of mixed carbon and alkali to eliminate the nitrogen from the excess of air so employed. Should the apparatus be worked for the production of a gaseous mixture relatively rich in hydrocarbon and low in carbon oxides, it will be found advisable to mix and pulverize the alkali with what is commonly known as "rich gas coals," and to work the steam petroleum-injector to a point only sufficient to maintain the requisite heat in section E of the converting-furnace 2.

This apparatus, arranged to be worked as herein described, can be made to operate continuously for the productions of cyanogen and compounds thereof, and of compounds of a gaseous mixture, the components thereof being greatly dependent upon the manner of working the process.

The advantage of the preliminary coking operation is that, while available combustible gases are thereby obtained, the coke for improving the gas, as already described, is also obtained. I desire to have it understood, however, that my process may be used and is claimed by me with or without said operation.

There are several other chemical operations to be performed subsequently to the production of the combustible gas and the cyanogen by my process—such as the elimination of the carbonic-acid gas from the mixture of gases produced, the production of ammoniacal gas or cyanides from the cyanogen or compounds thereof, the utilization of said ammoniacal gas for the elimination of said carbonic acid with the production of carbonate of ammonia, and the further absorption of the ammonia by water, and, if necessary, the further purification of the gas by lime; but, inasmuch as the purpose for which the gas is produced governs the extent and mode of its purification, and as any well-known and suitable methods may be employed for these purposes, it is not necessary to an understanding of my invention that such operations should be here described.

Having thus described my invention, what I claim is—

1. The herein-described process for producing combustible gas, as carbonic oxide and hydrogen, and cyanogen or a compound thereof, consisting of the simultaneous introduction of the following elements—to wit, steam, air, finely-divided carbon, and alkali—into a heated chamber, the forcible mixing of said elements, and the simultaneous decomposition and combination of said elements to produce in said chamber the gas and the cyanogen or compound thereof, substantially as set forth.

2. The herein-described process for producing combustible gas, as carbonic oxide and hydrogen, and cyanogen or a compound thereof, by the elimination of nitrogen from the nitrogen-bearing material, consisting of the introduction of the nitrogen-bearing material into a heated chamber and forcibly disseminating into and through the chamber pulverized carbon and an alkali, substantially as set forth.

3. The herein-described process for producing combustible gas, as carbonic oxide and hydrogen, and cyanogen or a compound thereof, by the elimination of nitrogen from the nitrogen-bearing material, consisting of the introduction of the nitrogen-bearing material into a heated chamber and forcibly spraying into and through the chamber pulverized carbon and an alkali by a jet of steam, substantially as set forth.

4. The herein-described process for producing combustible gas, as carbonic oxide and hydrogen, and cyanogen or a compound thereof, consisting of the simultaneous introduction of the following elements—to wit, steam, air, finely-divided carbon, and alkali—into a heated chamber, the forcible mixing of said elements, the simultaneous decomposition and recombination of said elements to produce in said chamber the gas and the cyanogen or compound thereof, and the passing of said gas through incandescent carbon, substantially as set forth.

5. The herein-described process for producing combustible gas, as carbonic oxide and hydrogen, and cyanogen or a compound thereof, consisting of the simultaneous introduction of the following elements—to wit, steam, air, finely-divided carbon, and alkali—into a heated chamber, the forcible mixing of said elements, the simultaneous decomposition and recombination of the elements to produce in said chamber the gas and the cyanogen or compound thereof, and the passing of said gas through incandescent carbon and through a carbureting-retort, substantially as and for the purposes described.

6. In an apparatus for the manufacture of gas, the combination, with a furnace-chamber, of a spraying and mixing device, a second furnace-compartment above and communicating with the first, a carbureting-retort within and heated by said second furnace-chamber and communicating at its upper end therewith, and a collecting-chamber for receiving solid material from the first chamber, substantially as set forth.

7. In an apparatus for the manufacture of gas, the combination, with a furnace-chamber, of an injector, a second furnace-compartment above and communicating with the same, a partition for preventing the fall of ashes into the first chamber, a carbureting-retort within the second compartment, communicating therewith at the upper end, and adapted to be charged with refractory material and a hydrocarbon, as described, and a collecting-chamber for receiving solid material from the first retort, substantially as set forth.

8. In an apparatus for the manufacture of gas, the combination, with a furnace-chamber, of the coking-furnace having the air and steam pipes, a pipe connecting the coking-furnace with the first chamber, an injector for forcing material into the furnace-chamber, and supply-pipes for the injector, substantially as set forth.

9. In an apparatus for the manufacture of gas, the combination, with a furnace-chamber, E, the compartment above the same adapted to receive incandescent carbon, the central carbureting-retort, situated in both of said compartments, opening into the upper, and adapted to contain refractory material, and the supply-pipe K, substantially as set forth.

S. R. DICKSON.

Witnesses:
A. E. SMYTHE,
JAS. S. NEGLEY.